United States Patent Office 3,555,680
Patented Jan. 19, 1971

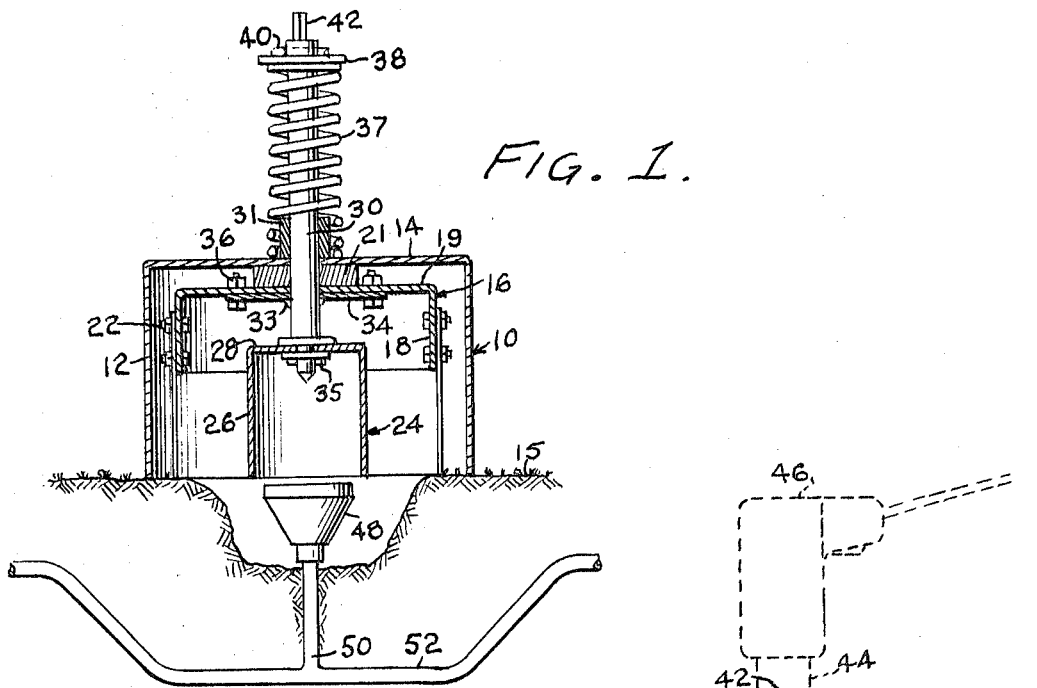
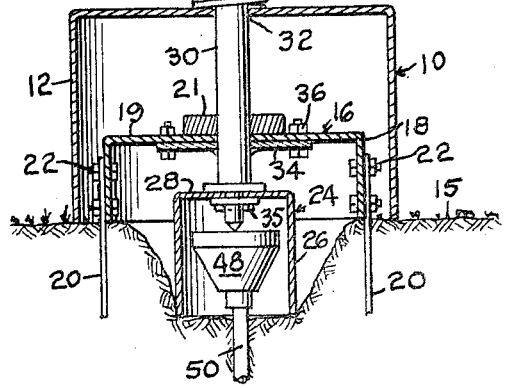
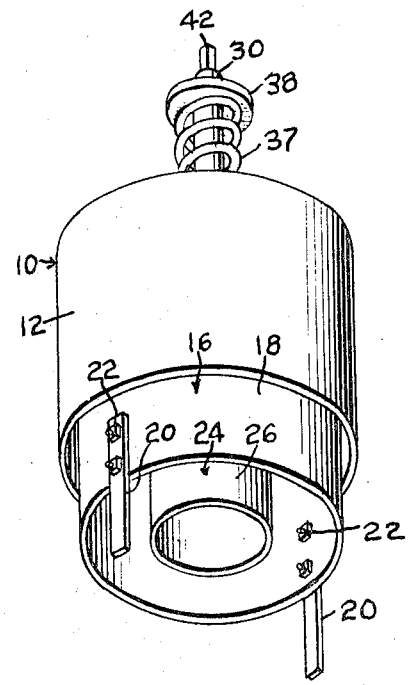
FIG. 1.
FIG. 2.
FIG. 3.
INVENTOR
Carey B. Ford.

3,555,680
TRIM AROUND SPRINKLER HEAD TOOL
Clancy B. Ford, 16901 Schoolcraft St.,
Van Nuys, Calif. 91406
Filed Jan. 8, 1968, Ser. No. 696,164
Int. Cl. B26b 29/00
U.S. Cl. 30—276                      3 Claims

ABSTRACT OF THE DISCLOSURE

A grass cutter has three concentric cups, the outermost and innermost cups engaging a lawn surface and a sprinkler head, respectively, to guide and limit cutting depth. The intermediate cup with blades thereon is vertically movable and rotated by a shaft externally engageable with a power drill.

BACKGROUND OF THE INVENTION

Lawn sprinkling systems in modern widespread use typically include a plurality of separate spaced-apart sprinkler heads, each of which is adapted to discharge water in a conical pattern of streams suitably angled relative to the ground such as 45 degrees. To facilitate lawn mowing and prevent damage to mower blades, it is customary to recess sprinkler heads below the surface of the lawn in separate small holes. Due to the propensity of many species of grass to spread laterally and swiftly during normal growth, and especially around water sources, the hole surrounding each sprinkler head regularly becomes choked with a vigorous concentration of growth which inhibits or totally prevents the mentioned conical spray pattern during sprinkler operation. The regular trimming operation thus necessitated to remove grass from each hole containing a sprinkler head is burdensome and time-consuming if done with hand shears, clippers or other manually operated devices known to the prior art, especially in lawns containing a large number of such heads.

SUMMARY OF THE INVENTION

This device consists of three concentric downwardly opening cups 10, 16 and 24. The two innermost cups are carried by a vertically extended operating shaft 30. The intermediate cup is driven by the rotating driven shaft and carries two cutting blades 20 extending downwardly and below the intermediate cup, and when the two innermost cups move downwardly, the innermost cup passes over and around the sprinkler head 48 to guide and hold the device in its proper position.

The upper end 42 of the shaft is machined to a given size, engageable with a rotating device, such as an electric drill 46. When the device is placed over a sprinkler head, the electric drill is started, a downward force is exerted longitudinally of the shaft to force the two inner cups downwardly.

The two cutting blades carried by the intermediate cup trims the grass during its downward movement. The innermost cup which is also carried by the driven shaft moves down and around the sprinkler head to a point where the shaft comes in contact with the sprinkler head. This determines the over-all depth the cutting blades 20 can cut. With this arrangement with a power driven device, each trimming operation is completed quickly and efficiently to the same depth. Therefore, remove the device from the sprinkler head, clean out the grass trimmings and the operation is complete.

BRIEF DESCRIPTION OF THE DRAWINGS

FIG. 1 is a cross sectional view of the device in position on a lawn around a sprinkler head, showing all parts in normal position.

FIG. 2 is a like view showing the parts in fully operative position.

FIG. 3 is an underside perspective of the device.

DESCRIPTION OF THE PREFERRED EMBODIMENT

The numeral 10 designates the outer member of the three cylinderically cup shaped members, all openings in a downward position. The number 10 represents a protective shield, having a cylindrical side wall 12 with an upper transverse base, 14. The lower edge of the protective shield 10 is in contact with the surface of the ground 15 when the device is to be operated.

The base 14 is provided with a sleeve bushing which is welded to the base 14 and perpendicular to same with the driven shaft placed therethrough, the shaft running through the sleeve 31 holds the entire device in alignment.

Of a smaller diameter than the casing 10 and placed concentrically there within is a cutting unit 16 having a cylindrical side wall 18 and a transverse upper base 19 below the base 14. The cutting unit 16 has a pair of diametrically opposite cutting blades vertically placed and secured at their upper ends as at 22, to the wall 18. A spacer 21 is placed between the base walls 14 and 19 to avoid rubbing together or friction. A square washer like plate 34 is welded to the driven shaft 30 at the given point 33, making a firm connection to each other. The plate 34 is secured to the base 19 by means of small bolts or otherwise, making a strong connection between the driven shaft 30 and the cutting unit 18.

A third inverted cup, unit 24, with much smaller dimensions, has a cylindrical side wall 26 with an upper transverse base 28 lying below the base 19. A shaft 30 extends through the base walls 19, 28, and 14, each through their respective openings. The machined lower end of the shaft 30 is pointed for localized contact with sprinkler head 48 and is rotatably connected to the base 28, which is held secure by a cotter pin 35.

A coiled spring 37 surrounds the shaft 30 and contacts its lower end with the base wall 14. The upper end of the spring engages a washer 38 held in position on the shaft 30 by a cotter pin 40. When the cutting unit is forced downward in its trimming operation, the shield unit 10 remains stationary on the lawn surface 15. This compresses the spring 37 shown in FIG. 2.

When the force is released from the unit 18 and the device is lifted from the lawn, the spring pressure automatically forces the protective unit 10 back to its normal position over the cutting unit 18.

The shaft 30 may be rotated manually or by power and preferably by power. The upper end of the shaft is machined at 42, engageable in a chuck 44 in connection with an electric drill 46, FIG. 2.

The sheeve bushing 31 on the shaft 30 shown in FIG. 1 holds the entire device in perfect alignment. FIG. 2 shows the driven shaft 30 in contact with the sprinkler head which determines the overall depth the cutting unit goes in a completed operation.

FIG. 1 shows a water system which carries water to the sprinkler head 48 through the water lines 52 and 50.

In using the device, the lower edges of the cylindrical walls 12, 18 and 26 are placed on the ground and over the sprinkler head, whereby all three are approximately parallel with the sprinkler head 48. The source of power is then started in operation and a downward manual force against the drill or power unit will force the shaft 30 downwardly together with the unit 24 and the cutting unit 16. The cutting blades 20 will trim the grass as they are forced downward by the unit 18 as shown in FIG. 2. Centering unit 24 is shown over and around the sprinkler head 48 in an operating position which centers and holds the device in the same position while cutting a perfect circle around the sprinkler head.

It is obvious that each trimming operation may be completed in a very few seconds since each and every unit of this device is made and set to do its own work. All that is necessary is to place the device, turn on the power with a downward pressure on the shaft. With this device many sprinkler heads on a very large lawn can be completed in a very short time with every operation uniform.

From the foregoing description it will now be seen that I have provided an improved grass trimmer for sprinkler heads which accomplishes all the objects of this invention and others, including many advantages of practical use and commercial importance.

I claim as my invention:

1. In a grass-cutting device for trimming around a hole-recessed upright sprinkler head in a lawn:

an elongate upright shaft adapted for rotation about a center longitudinal axis therethrough, centering means comprising a first generally cylindrical downwardly depending cup supported on said shaft proximate the lower distal end thereof, said first cup having a center longitudinal axis adapted for vertical orientation through this sprinkler head when said first cup is placed completely over said sprinkler head, a second generally cylindrical downwardly depending cup secured to said shaft and rotatable therewith, said second cup being substantially concentric with said first cup and said elongate shaft, blade means mounted on said second cup for rotation in a generally cylindrical-shaped cutting path concentric about said sprinkler head, a third generally cylindrical downwardly depending cup operatively connected to said upright shaft and adapted to contact a ground portion proximate said sprinkler head, said third cup being substantially concentric about said first and second cups and substantially enclosing said blade means and said first and second cups, and bearing means mounted on said third cup for applying lateral restraint to maintain said shaft upright.

2. The structure set forth in claim 1 above, further including:

movable connection means between said upright shaft and said third cup for downward movement of said shaft and said first and second cups relative to said third cup during said contact between said third cup and said ground portion, 3. The structure set forth in claim 2 above, further including:

spring means connected between said upright shaft and said third cup for biasing said shaft against said downward movement of said shaft.

References Cited

UNITED STATES PATENTS

| | | | |
|---|---|---|---|
| 2,953,852 | 9/1960 | Dehn | 30—205 |
| 3,062,299 | 11/1962 | Koepfinger | 30—316 |
| 3,143,176 | 8/1964 | Drane | 30—316 |
| 3,174,224 | 3/1965 | Rousselet | 30—264 |

ROBERT C. RIORDON, Primary Examiner

J. C. PETERS, Assistant Examiner

U.S. Cl. X.R.

30—287, 300